United States Patent [19]
Heilweil

[11] Patent Number: 4,881,135
[45] Date of Patent: Nov. 14, 1989

[54] CONCEALED AUDIO-VIDEO APPARATUS FOR RECORDING CONFERENCES AND MEETINGS

[76] Inventor: Jordan B. Heilweil, Fox Rd., Florida, N.Y. 10921

[21] Appl. No.: 248,197

[22] Filed: Sep. 23, 1988

[51] Int. Cl.⁴ .............................................. H04N 5/76
[52] U.S. Cl. ..................................... 358/335; 358/108
[58] Field of Search ........................ 358/108, 229, 335

[56] References Cited

U.S. PATENT DOCUMENTS 4,249,206  2/1981  Roscoe ............................ 358/108 X
4,524,384  6/1985  Lefkowitz et al. ................. 358/108

FOREIGN PATENT DOCUMENTS 2141306  12/1984  United Kingdom ............... 358/108

OTHER PUBLICATIONS

Video Security Systems 2nd Ed., Keith W. Bose, 1982, pp. 1–20.

Primary Examiner—Robert L. Richardson
Attorney, Agent, or Firm—Lilling & Greenspan

[57] ABSTRACT

A concealed audio-video apparatus for recording conferences and meetings includes a housing or cabinet that simulate a speaker enclosure of an audio sound system. Contained within the cabinet is a video camera and its microphone, video recorder, power supply and date and time generator. A wireless controller actuates and de-actuates the recording of activities within the field of view of the camera through an opening in the cabinet, and red and green LEDs mounted on the cabinet provide visual feedback to the user of the apparatus whether or not it is recording or is in standby mode.

16 Claims, 2 Drawing Sheets

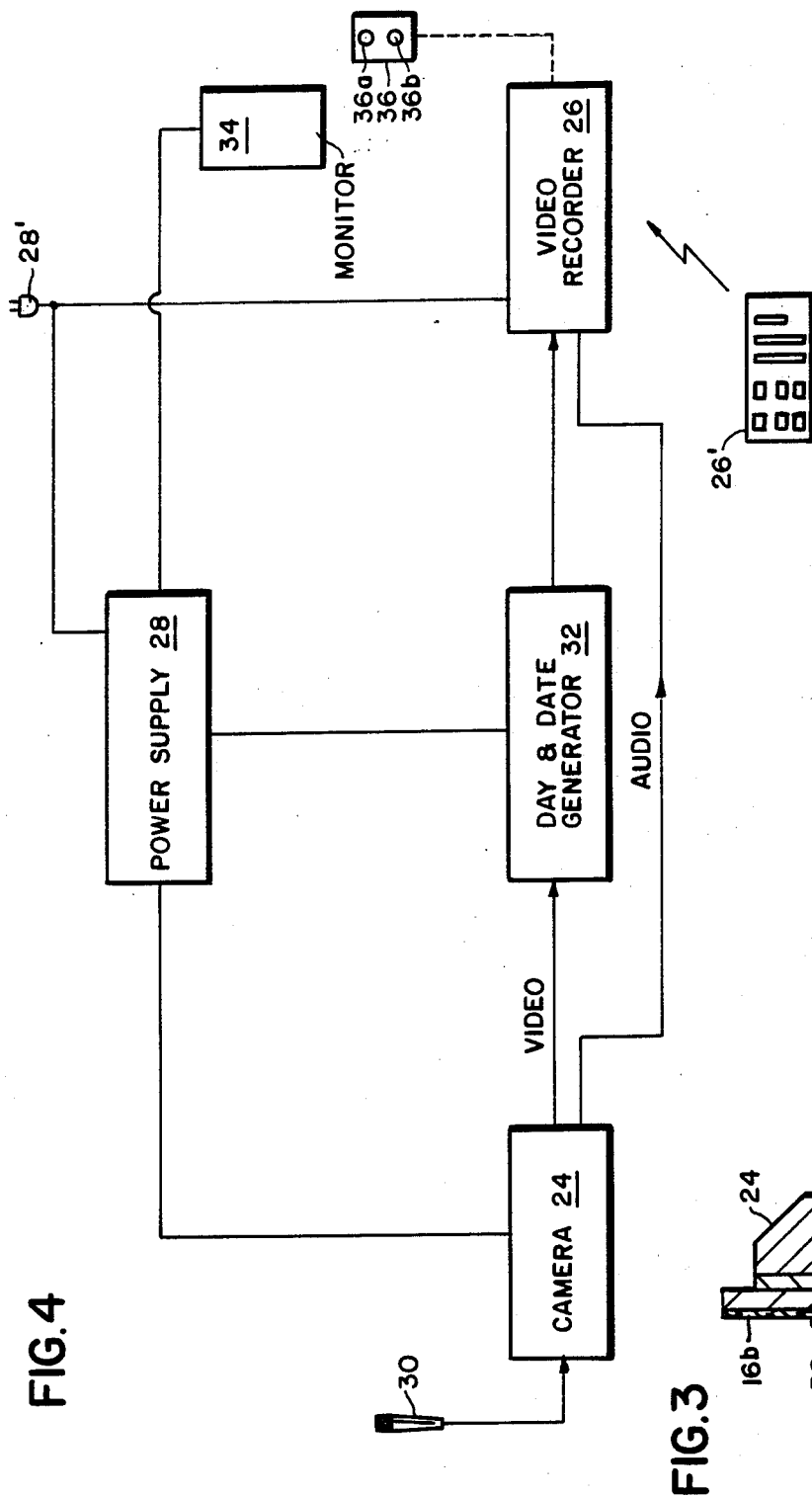

CONCEALED AUDIO-VIDEO APPARATUS FOR RECORDING CONFERENCES AND MEETINGS

BACKGROUND OF THE INVENTION

1. Field of the Invention

This Invention generally relates to electronic recording devices, and more specifically to a concealed audio-video apparatus for recording conferences and meetings.

2. Description of the Prior Art

It is frequently desirable to record meetings between individuals in order to establish at a future date what occurred or what was discussed at the meeting. An important application for such a recording system is its use by physicians, attorneys or other individuals who are exposed to malpractice suits, grievance suits, harassment suits or the like. For example, one form of suit is based upon "informed consent" which is premised on an injury caused by a physician or other professionals who allegedly did not properly inform the complainant of the risk or risks involved in certain procedures and, therefore, the person damaged did not provide his consent to such procedures. In any legal action filed to recover damages in such situations the Court must frequently consider conflicting testimony and base its decision upon the weight of creditability that it attaches to the testimony of one party or the other. Therefore, depending on which side provides the most effective presentation of evidence or is the most believable may win the suit, although this may be inconsistent with the true facts.

Numerous patents have been issued which deal with recording devices. Many of these patents deal with surveilance cameras which are either always continuously on or are periodically actuated for substantially equal periods of recordation with substantially equal lapse time intervals in between. Typical of these patents is U.S. Pat. No. 3,739,703 to Behles which includes a dome of transparent glass or plastic material which is at least partially metalized so as to reflect a portion of the light rays inpinging on the dome from the outside. Such surveilance cameras are typically used in retail establishments and banks and their presence is normally fairly obvious. In fact, some retailers merely install the domes or surveilance camera housings without actually installing surveilance cameras. The visibility of such camera domes or housings are hoped to be a deterant to would be shoplifters or the like. Additionally, such surveilance cameras are typically intended only to record video and not sound. Thus, such surveilance cameras are typically mounted in the ceiling of the establishment and record the video through the dome or housing, but microphones are not provided for recording the audio. Either these cameras are constantly on and record everything or take sequences of photographs at predetermined time intervals. In U.S. Pat. No. 4,654,703 to Viera, a control is provided which includes an on-off power switch and various other controls for controlling the position of the camera and the field of view.

A number of surveilance cameras and their housings have also been disclosed in design patents to protect their overall appearance. Since these housings are generally exposed and placed in clearly visible locations, these design patents reflect a desire to make these housings esthetically pleasing.

In U.S. Pat. No. 3,158,431 to Gutjahr et al., an apparatus is shown for psychological testing. The purpose of the arrangement is to evaluate the visual attractiveness of editorial advertising matter in newspapers, magazines, and the like. For this purpose, the subject is brought into a room, where he alone reviews the printed matter. While the person may be aware of the fact that a test will be taking place, he is not informed of the nature of the test. In Gutjahr, a cabinet is provided which has a transparent window through which the person's eye movements can be recorded and analyzed. The camera may be started by means of controls outside of the room or test chamber. Only the video information is of interest and there appears to be no recordation of audio.

SUMMARY OF THE INVENTION

Broadly, the invention is for a concealed audio-video apparatus which comprises video recording means for recording video imaged on a portion of said recording means. A microphone is provided which is connected to said recording means, said imaging portion of said recording means and microphone being arranged approximate to an area within which a conference or meeting is to take place. Power input means is provided for energizing said video recording means. Enclosure means houses at least said imaging portion of said video recording means. Remote control means is provided for remotely controlling the operation of said video recording means, said enclosure means permitting recording therethrough while concealing said video recording means housed therein. Positioning means positions said enclosure means to provide a desired imaging field of view of the conference or meeting area, whereby both the video and audio information reflecting the conference or meeting can be recorded by the selective control by one of the parties to the conference or meeting without the knowledge of the other(s) to thereby enable the candid audio and video recordation of the statements and actions taken by the attendees of the conference or meeting.

BRIEF DESCRIPTION OF THE DRAWINGS

The foregoing and other features of the present invention will be more readily apparent from the following detailed description and drawings of an illustrative embodiment of the invention in which:

FIG. 3 is an enlarged partial cross-sectional view of the door or cover of the cabinet or housing of the apparatus, shown in FIG. 2, taken along line 3—3 to illustrate how the video information may be received by the video recording camera within the cabinet or housing; and FIG. 4 is a schematic block diagram illustrating the components of the system and the manner in which they are interconnected.

DESCRIPTION OF THE PREFERRED EMBODIMENT

Figure 1:
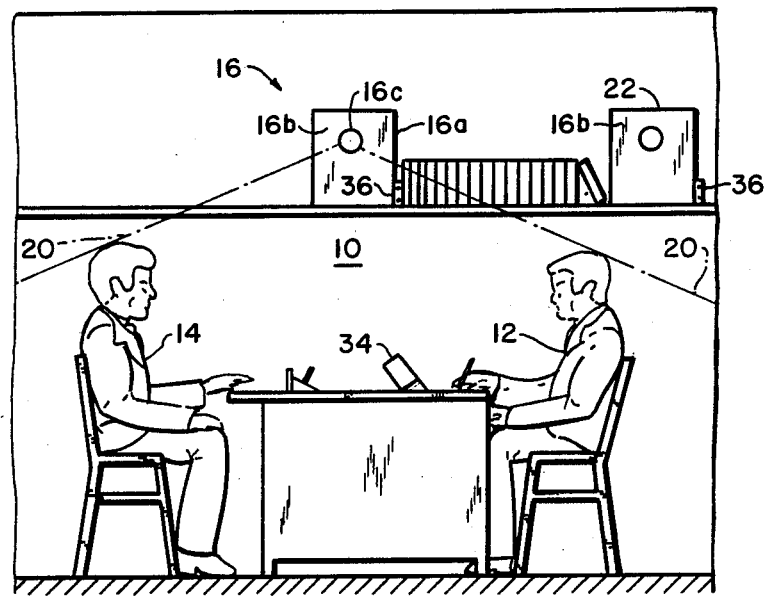
FIG. 1 is a general view of a room or office within which a conference or meeting is taking place, showing how the concealed recording device in accordance with the present invention may be arranged.

Referring now specifically to the figures, in which identical or similar parts are designated by the same reference numerals throughout, and first referring to FIG. 1, the reference numeral 10 generally designates an office, a conference room or other area in which a meeting or conference can take place. Two individuals are shown within the area 10 having such a conference or discussion. For example, the individual 12 may be a doctor and the individual 14 may be his patient. Such a meeting may typically be a consultation prior to an important medical procedure taking place, such as elective surgery. The concealed recording device in accordance with the present invention is designated by the reference numeral 16 is used to record and preserve the actions taken and the words said by the individuals so that there can be no dispute at a later date as to what may or may not have taken place or have been said.

The concealed recording device 16 is shown supported on a shelf 18 to ensure that the recording field of view 20 encompasses the individuals being recorded.

Also shown supported on the shelf 18 is a decoy enclosure or cabinet 22, the use of which will become apparent from the discussion that follows.

Figure 2:
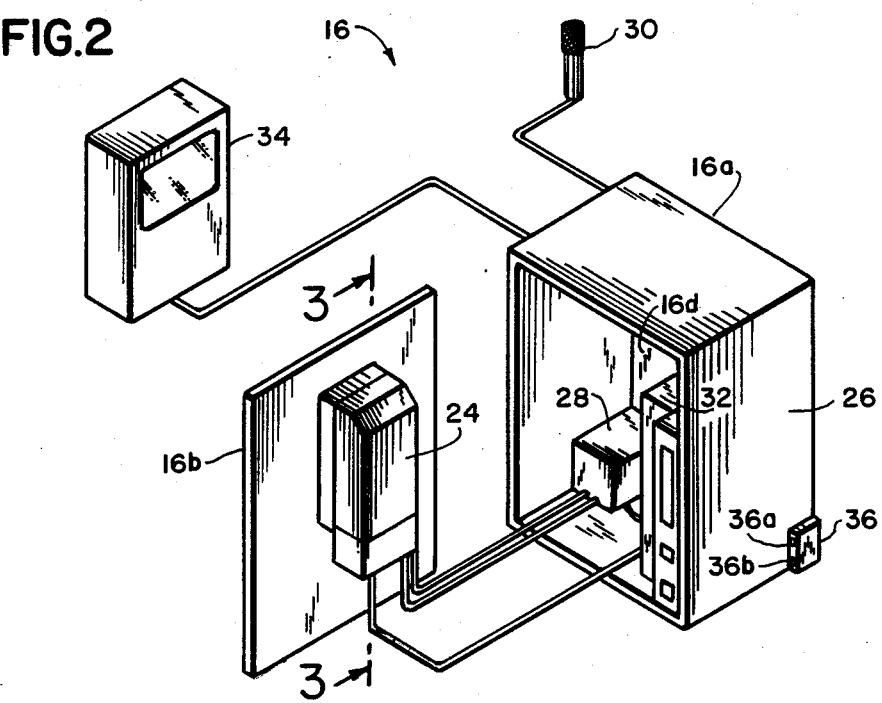
FIG. 2 is a perspective view of the concealed audio-video apparatus in accordance with the invention, shown partially exploded to illustrate how the various components may be arranged.

The recording device 16 includes an enclosure, cabinet or housing 16a which advantageously has a movable front cover 16b, as viewed in FIG. 2. For reasons to be discussed, the cover 16b can be made of a light transmissive material or may be opaque but provided with an opening 16c through which video or optic information can be transmitted. An opposing rear cover 16d may be provided although is not essential.

Mounted on the cover 16b is a video camera 24. Referring to FIG. 3, the camera 24 is mounted to align its optical system with the aperture or opening 16c in the cover.

Contained within the enclosure 16a is a video recording device 26 and a power supply 28 which provides the necessary voltages for the camera 24 and the video recorder 26 and to a monitor when the same is connected to the device.

Importantly, the recording apparatus includes a microphone 30 which is connected to the camera 24 and/or the video recorder 26, the microphone 30 typically being concealed, but arranged to pick up the voices of the individuals 12, 14.

Advantageously, a day and date generator 32 is provided, as will be more fully discussed below, which can also be housed within the enclosure 16a and energized by the power supply 28.

Also shown in FIG. 2 is a television monitor 34 which can be used to initially set up and align the recording device 16, and subsequently can be connected to view the recorded the meeting or conference.

Also shown in FIG. 2 is a visual feedback indicator 36, shown mounted to the side of the enclosure 16a and which has light output indicators 36a and 36b. The indicator 36a may be a green LED, while the indicator 36b may be a red LED, respectively indicating that the recording device is on or off.

Referring to FIG. 4, the interconnections of the above-mentioned elements or components is shown. The power supply 28 is shown to be provided with an AC power cord 28'. Clearly, the video recorder 26 or any of the other components may be provided within internal power supplies in which case they can be directly plugged into an appropriate AC outlet. If all of the components are provided with their own internal power supplies then, of course, the power supply 28 may be omitted. However, typically compact video cameras of the type contemplated do not contain their own internal power supply and must be provided with an external source of DC voltage. In the presently described embodiment, the camera 24 and the day and date generator 32 are each provided with 12 volts DC, while the video recorder 26 is provided with 110 volts AC, and 6 volts DC are provided for the video monitor 34.

The microphone 30 is advantageously a highly sensitive microphone so that it can be located in any convenient location and is sufficiently sensitive to pick up the conversations of all of the individuals in the conference or meeting area. For example, the microphone 30 may be an FET microphone.

The visual feedback indicator 36 is an optional feature, although it is highly desirable in order to provide the individual 12 controlling the recording device with a positive feedback or indication that the recording device is operative or disabled. For this purpose, the visual feedback indicator is advantageously positioned or located so that only the individual 12 will see the LEDs 36a and 36b. One possible location is on the side of the enclosure 16a, which faces the individual 12, as suggested in FIGS. 1 and 2.

Remote control means is provided for remotely controlling the operation of the video recording device 16. The specific nature of such remote control is not critical. Shown in FIG. 4 is a wireless remote controller 26' of the type commonly used with video recording devices. Such a wireless remote controller can be used to activate and de-activate the video recorder 26. However, other control devices can be used, such as a foot switch or any other switch which is directly connected to the video recorder 26 and is easily accessible to the individual 12.

Although a separate video camera 24 and a video recorder 26 have been shown, it should be evident that these units may be combined into a single unit. With the advent of cam-corders which integrate these two components, these two separate units as shown is not essential. However, it may be desirable to utilize a separate video camera in order to assure optimum compactness and operating characteristics. One example of a video camera that can be used is Model No. HVM 332/HVA 441 manufactured by Sony Corporation.

It should also be evident that while it is important for the video camera 24 to be housed within the enclosure 16a, the remaining components shown within the housing, namely the video recorder 26, the power supply 28 and the day and date generator 32 may be disposed exteriorily of the enclosure 16a and, indeed, outside of the conference room or area 10. It is only important to place within the enclosure 16a that portion of the recording device which images the video. Therefore, only the optical system which receives the video through either a transparent cover 16b or through the appature 16c must be housed within the enclosure. However, where the enclosure is sufficiently large, or the components are sufficiently small, there is no reason not to place most or all of these components within the enclosure for the sake of compactness, facility of interconnection, and prevention of undesired pick up or interference. Normally the microphone 30 is built into and is part of the video camera 24 and would, therefore, also be contained within the enclosure 16. It is possible, however, to use an external or auxiliary microphone which is not part of the camera in which case it can be positioned in any suitable location inside or outside of the enclosure.

While the recording device 16 has been shown mounted on a shelf 18, any positioning means may be used. This may be a piece of furniture, a separate stand or stand-alone cabinet. The only requirement for the positioning means is that it provide and insure a desired imaging field of view 30 of the conference or meeting area. In this way, both the video and audio information reflecting the conference or meeting can be recorded by the selective control by the individual 12 without the knowledge of the individual 14. This enables candid and audio and video recordation of the statements and actions taken by the attendees of the conference or meeting.

The day and date generator 32 is also an optional feature, although an important one. When used, each frame of the resulting video tape is identified with a day and date thereby facilitating the identification of the specific meeting or conference in question.

Where an aperture or hole 16c is placed in the cover 16b, there may be provided a light transmissive cover or plate 38 to hide or camouflage the aperture 16c. Where a light transmissive cover 16b or a light transmissive plate 38 is utilized, these must be sufficiently light transmissive so as to permit transmission of the video information for recordation.

Clearly, one of the objects of the invention is to conceal or camouflage the nature of the recording device to permit the recordation of the candid or spontaneous statements made by the individuals. In accordance with one presently preferred embodiment, the enclosure 16 simulates a cabinet or housing of an audio sound system loudspeaker. Where the housing or cabinet 16a simulates the enclosure of a loudspeaker, there may also be provided the decoy enclosure or cabinet 22, as above-mentioned, to simulate a pair of cabinets of loudspeakers of a stereo sound system. However, it should be clear to those skilled in the art that any other shaped enclosures may be used to camouflage or conceal the nature of the device.

The concealed recording device of the invention enables a physician, lawyer or any other professional or corporation exposed to malpractice suits or the like to discreetly video any or all conversations with their patients or clients. Permanent video records and the appropriate filing and archiving of these records make the device simple to use and serves as an excellent preventative to expensive malpractice exposure for the innocent practicioner.

Unlike other surveilance cameras or systems used in retail establishments, the recording device is capable of recording and reproducing high quality video and audio tapes. The system is designed for simplicity and dependability. Most informed consent malpractice suits may be prevented or at least assisted based on statements or deletions made during such recorded meetings or conferences. To the extent that the recording device reproduces all of the actions and statements made possibly many years previously, it saves the loss of valuable time appearing in court, depositions, and other pre-court proceedings. Equally important is the fact that a court, should legal proceedings be initiated, will have the benefit of the discussions that took place which may be in issue and, therefore, need not determine serious questions of credibility but may make a decision on the merits and the factual recorded statements.

While the invention is described with reference to a specific embodiment thereof, it is to be understood that the invention may be embodied in other forms, many of which do not incorporate all of the features present in this specifc embodiment of this invention which has been described. For this reason, the invention is to be taken and limited only as defined by the Claims that follow.

What is claimed is:

1. Concealed audio video apparatus, comprising video recording means for recording video imaged on a portion of said recording means; a microphone connected to said recording means, said imaging portion of said recording means and microphone being arranged proximate to an area within which a conference or meeting is to take place; power input means for energizing said video recording means; enclosure means for housing at least said imaging portion of said video recording means; remote control means for selectively remotely controlling the operation of said video recording means, said enclosure means permitting recording therethrough while concealing said video recording means housed therein; and positioning means for positioning said enclosure means to provide a desired imaging field of view of the conference or meeting area, whereby both the video and audio information reflecting the conference or meeting can be recorded by the selective control by one of the parties to the conference or meeting without the knowledge of the other(s) to thereby enable the candid audio and video recordation of the statements and actions taken by the attendees of the conference or meeting.

2. Concealed apparatus as defined in claim 1, wherein said video recorder means comprises a video camera and a video recorder.

3. Concealed apparatus as defined in claim 1, wherein said power input means comprises a power supply.

4. Concealed apparatus as defined in claim 3, wherein said video recording means and said power supply are housed in said enclosure means.

5. Concealed apparatus as defined in claim 1, further comprising a day and date generator connected to said video recording means to add time and/or date information to the recorded video and audio information.

6. Concealed apparatus as defined in claim 1, further comprising a monitor connectable to said video recording means which can be used to set up the apparatus and to view the recorded information.

7. Concealed apparatus as defined in claim 1, wherein said enclosure means comprises a cabinet one wall of which permits video recordation therethrough.

8. Concealed apparatus as defined in claim 7, wherein said cabinet wall is at least partially light transmissive.

9. Concealed apparatus as defined in claim 7, wherein said cabinet wall is provided with aperture means to permit transmission of light.

10. Concealed apparatus as defined in claim 9, further comprising camouflaging means for camouflaging said aperture means.

11. Concealed apparatus as defined in claim 1, wherein said remote control means comprises a wireless remote control.

12. Concealed apparatus as defined in claim 1, wherein said enclosure means simulates a cabinet or housing of an audio sound system loudspeaker.

13. Concealed apparatus as defined in claim 12, further comprising decoy means which is similar in exterior appearance to said enclosure means to simulate a pair of cabinets of loudspeakers of a stereo sound system.

14. Concealed apparatus as defined in claim 1, further comprising visual feedback means for providing a visual indication that said video recording means is activated and is in the recording mode.

15. Concealed apparatus as defined in claim 14, wherein said visual feedback means is mounted exteriorily of said enclosure means.

16. Concealed apparatus as defined in claim 15, wherein said visual feedback means is arranged only to be visible by the party controlling the operation of said recording means.

* * * * *